United States Patent [19]
Tanaka et al.

[11] Patent Number: 5,596,384
[45] Date of Patent: Jan. 21, 1997

[54] FILM FEEDER THAT REDUCES FILM TENSION

[75] Inventors: Yasuhiko Tanaka; Minoru Takahashi, both of Ohmiya, Japan

[73] Assignee: Fuji Photo Optical Co., Ltd., Saitama-Ken, Japan

[21] Appl. No.: 411,543

[22] Filed: Mar. 28, 1995

[30] Foreign Application Priority Data

Jul. 15, 1994 [JP] Japan .................................. 6-163746

[51] Int. Cl.$^6$ ........................................ G03B 1/18
[52] U.S. Cl. ............................. 396/413; 396/418
[58] Field of Search .................................. 354/206, 213, 354/173.1, 203, 218, 173.11

[56] References Cited

U.S. PATENT DOCUMENTS 4,576,457 3/1986 Fukuda et al. .
4,720,721 1/1988 Hamada et al. .
5,345,286 9/1994 Stiehler .

FOREIGN PATENT DOCUMENTS 64-66631 3/1989 Japan .

*Primary Examiner*—David M. Gray
*Attorney, Agent, or Firm*—Brumbaugh, Graves Donohue & Raymond

[57] ABSTRACT

A film feeder for taking up a film from a film container one frame at a time by rotation of a takeup spool driven by a film feed motor. The film feeder is provided with a film tension control means for actuating the feed motor in the opposite direction to the direction in which the film is fed only by an amount sufficient to relieve the tension of the film while the film is maintained at a predetermined position every time the film is fed for one frame.

5 Claims, 5 Drawing Sheets

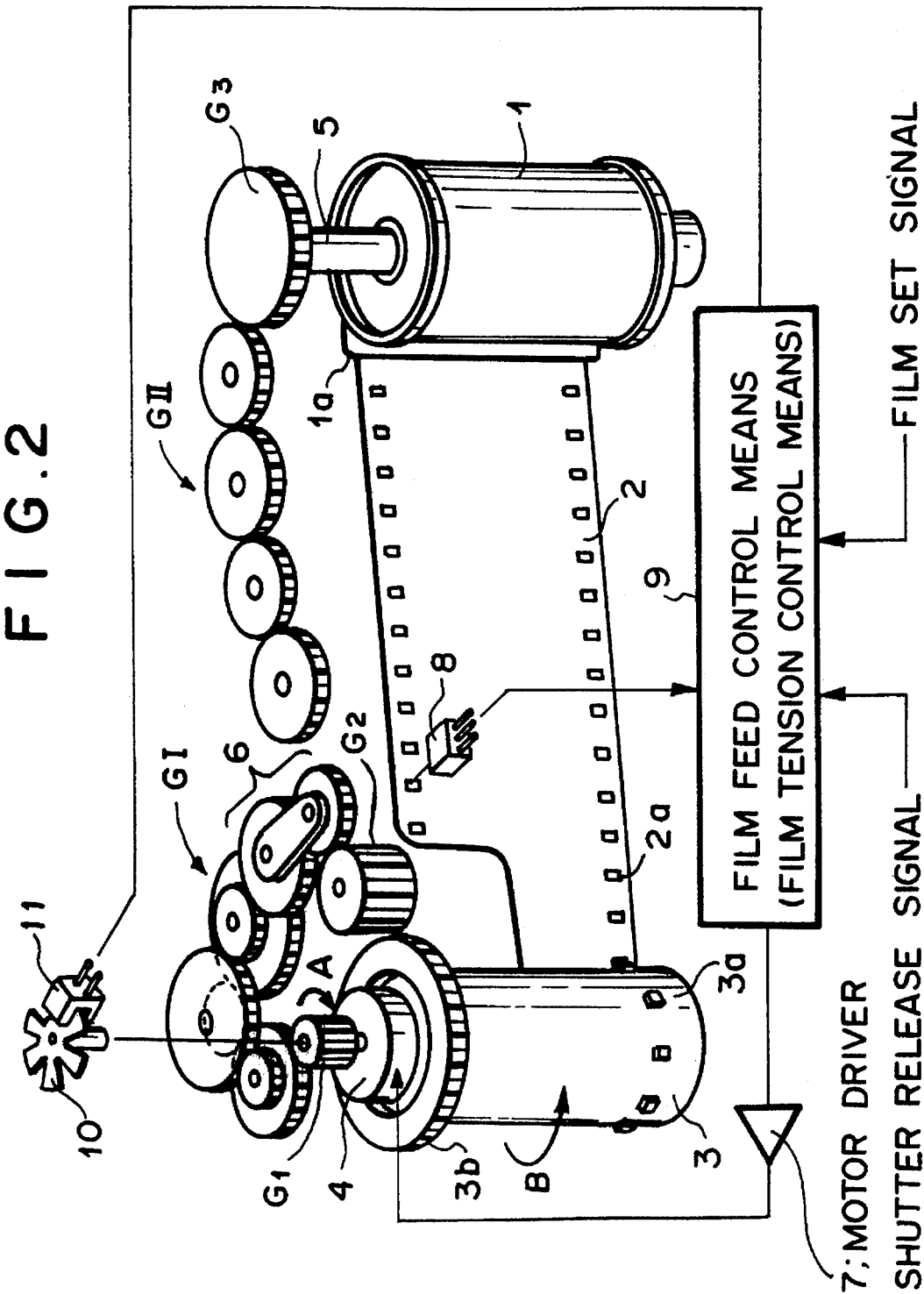

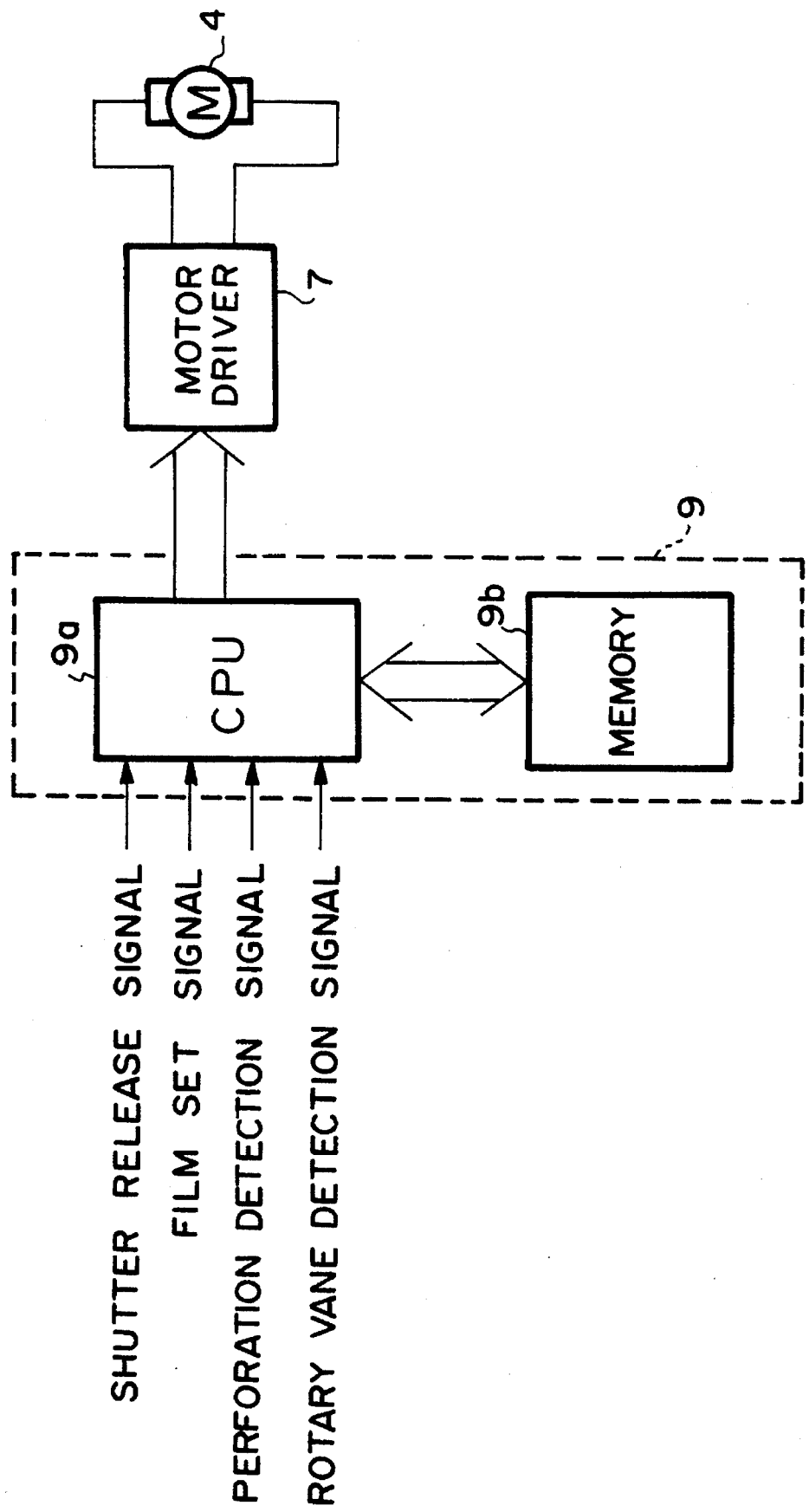

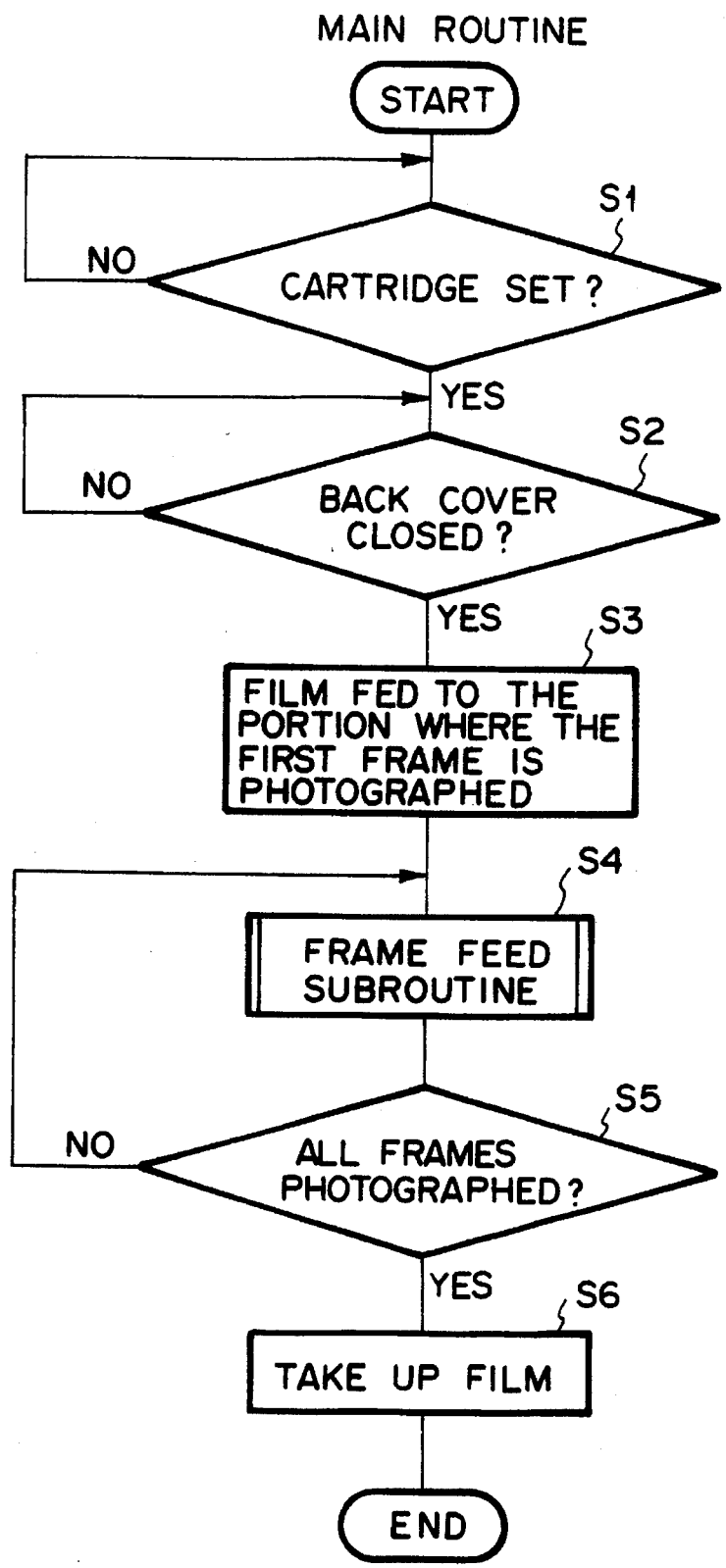

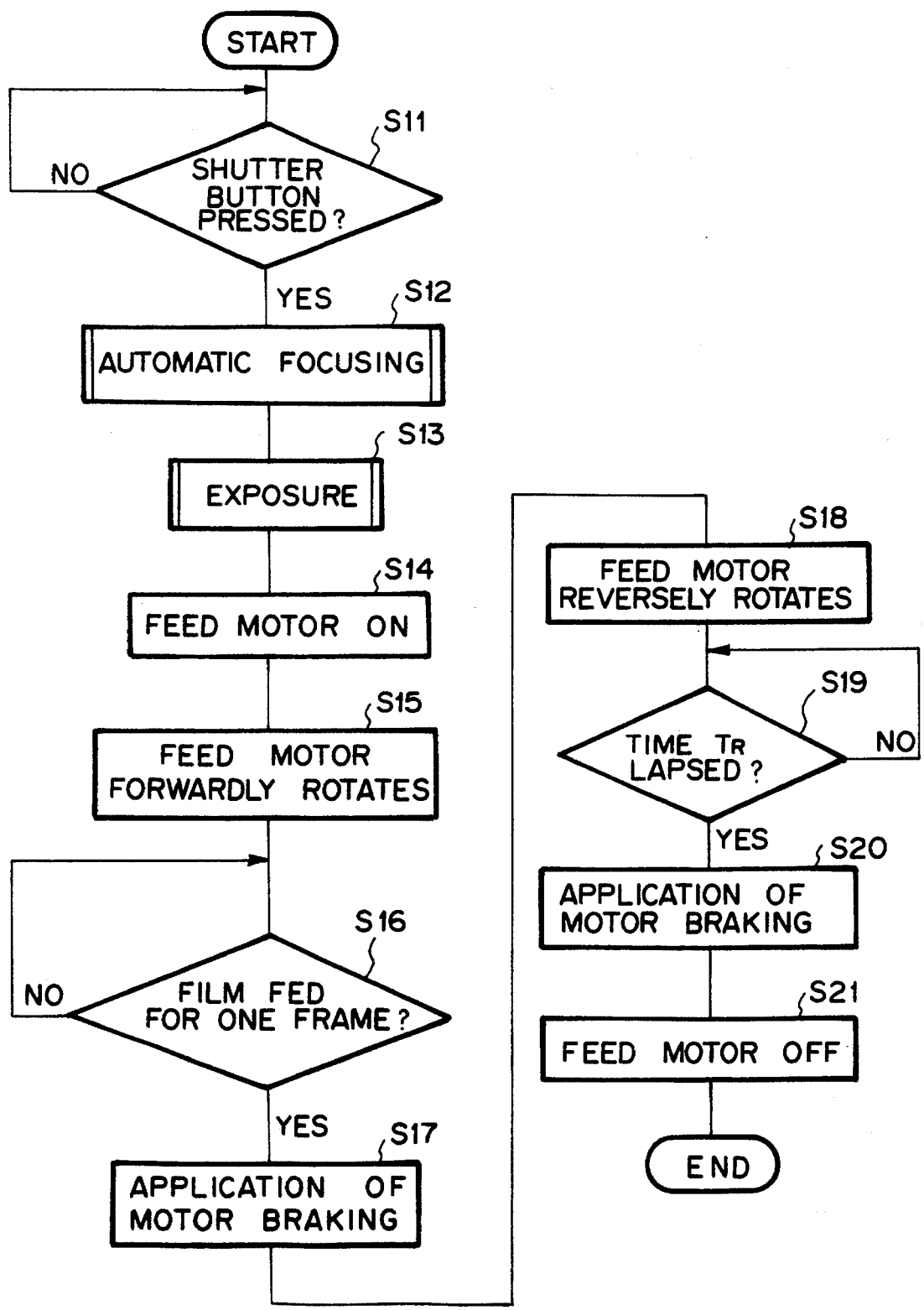

FILM FEEDER THAT REDUCES FILM TENSION

BACKGROUND OF THE INVENTION

1. Field of the Invention

This invention relates to a film feeder for feeding a film stored in a film container such as a cartridge loaded in a camera, and more particularly to a film feeder for taking up a film from a cartridge by rotating a takeup spool by means of a film feed motor and a train of gears which mesh with the film feed motor.

2. Description of the Prior Art

Such a film feeder is commonly constructed in the manner, for example, as shown in FIG. 1. Specifically, a cartridge 1 is set to a predetermined location in a camera, and perforations 2a of a film 2 drawn from the cartridge 1 are meshed with a sprocket 3a of a takeup spool 3. With this arrangement, a film feed motor 4 housed in the takeup spool 3 is forwardly rotated (in the direction shown by an arrow A) at a predetermined velocity, and a gear G1 attached to a shaft of the film feed motor 4 rotates forwardly. This torque is transmitted to the takeup spool 3 by way of a train of gears GI, and the takeup spool 3 rotates in the direction shown by an arrow B, whereby the film 2 is taken up.

Subsequently, when the first frame of the film 2 is taken up to an exposure position, the revolution of the film feed motor 4 is stopped. The film feed motor 4 rotates forwardly by a predetermined amount every time one frame of the film 2 is exposed, whereby the film 2 is taken up one frame at a time.

However, the torque of the film feed motor 4 is not transmitted to a rewinding fork 5, meshing with a film spool of the cartridge 1, when the film 2 is taken up, and therefore the film 2, coiled around the film spool of the cartridge 1, is only pulled by means of torque of the takeup spool 3. In this way, the film 2 is drawn from a film supply slot la of the cartridge 1.

The film 2 is drawn to the outside while being sandwiched between two pieces of plush for light shielding purposes at the film supply slot la of the cartridge 1. Hence, predetermined tension acts on the film 2 drawn from the cartridge 1 between the takeup spool 3 and the film supply slot la of the cartridge 1.

At the end of the feeding of one frame of the film 2, predetermined tension acts on the film 2 while the film 2 is pulled to each end. The tension acts unevenly on the film 2 in a transverse direction thereof, which impairs the flatness of the film 2. If the frame of the film 2 is exposed in this state, a distorted object image will be formed on the film 2.

SUMMARY OF THE INVENTION

In view of the foregoing drawbacks in the prior art, the object of the present invention is to provide a film feeder that provides a film with improved flatness by mitigating tension acting on the film after the feeding of the film in a camera.

To achieve this object, according to one aspect of the present invention, there is provided a film feeder for taking up a film from a film container one frame at a time by rotation of a takeup spool driven by a film feed motor, the improvement being characterized by comprising:

a film tension control means for actuating the film feed motor only by an amount sufficient to relieve the tension of the film in the opposite direction to the direction in which the film is fed while the film is maintained at a predetermined position every time the film is fed for one frame.

In one preferred embodiment, the film feeder further comprises a first photosensor means which sends a detection signal to the film tension control means upon detection of perforations of the film;

a rotary vane coaxially attached to a rotary shaft of the film feed motor; and a second photosensor having a U-shaped cross section for detecting rotation of the rotary vane which delivers an output of detection pulses to the film tension control means every time the rotary vane passes through the photosensor.

In another preferred embodiment, the film feeder further comprises a first train of gears at one end thereof connected to the rotary shaft of the film feed motor for transmitting a driving force, in the direction of feeding of the film, from the film feed motor to the takeup spool;

a second train of gears at one end thereof connected to a rewinding fork of the film container for transmitting a driving force, in the direction opposite to the film feed direction, i.e., in the direction of rewinding of the film, from the film feed motor to the rewinding fork; and planetary gears with a larger gear thereof connected to the other end of the first train of gears for transmitting the driving force to the takeup spool when the driving force is to take up the film but transmitting the driving force to the rewinding fork when the force is to rewind the film.

According to another aspect of the present invention, there is provided a film feeder for taking up a film from a film container one frame at a time by rotation of a takeup spool driven by a film feed motor, and the film feeder including a first train of gears for transmitting a driving force, in the direction of feeding of the film, from the film feed motor to the takeup spool, a second train of gears for transmitting a driving force, in the direction opposite to the film feed direction, i.e., in the direction of rewinding of the film, from the film feed motor to a rewinding fork, and planetary gears for transmitting the driving force to the takeup spool when the driving force is to take up the film but transmitting the driving force to the rewinding fork when the force is to rewind the film, the improvement being characterized by comprising:

a film tension control means for actuating the film feed motor only by an amount sufficient to relieve the tension of the film in the opposite direction to the film feed direction while the film is maintained at a predetermined position every time the film is fed for one frame.

In a preferred embodiment, the film feeder further comprises a first photosensor means which sends a detection signal to the film tension control means upon detection of perforations of the film;

a rotary vane coaxially attached to a rotary shaft of the film feed motor; and a second photosensor having a U-shaped cross section for detecting rotation of the rotary vane which delivers an output of a detection pulse to the film tension control means every time the rotary vane passes through the photosensor.

Throughout the specification, the spool used in the specification designates not only a takeup spool for taking up a film when a frame of the film is fed but also a so-called rewinding spool for rolling up the film after the exposure of all frames of the film.

According to the constructions set forth above, the film feed motor, controlled by the film tension control means, is actuated in the direction of rewinding of the film by a predetermined amount sufficient to relieve the tension of a film while a frame of the film is maintained substantially at a predetermined location. Thereby, tension acting longitudinally on the film between the takeup spool and the film supply slot of the cartridge at the time of feeding of a frame is relieved. This also alleviates tension acting unevenly on the film in the traverse direction thereof, thereby resulting a film having improved flatness.

BRIEF DESCRIPTION OF THE DRAWINGS

FIG. 2 is a schematic representation showing the structure of a film feeder in one embodiment according to the present invention;

FIG. 3 is a block diagram for showing a film feed control means shown in FIG. 2;

FIG. 4 is a flow chart for explaining a main program routine associated with processing of the CPU shown in FIG. 3; and FIG. 5 is a flow chart for explaining the frame-feed subroutine shown in FIG. 4.

DETAILED DESCRIPTION OF THE PREFERRED EMBODIMENT

Figure 1:
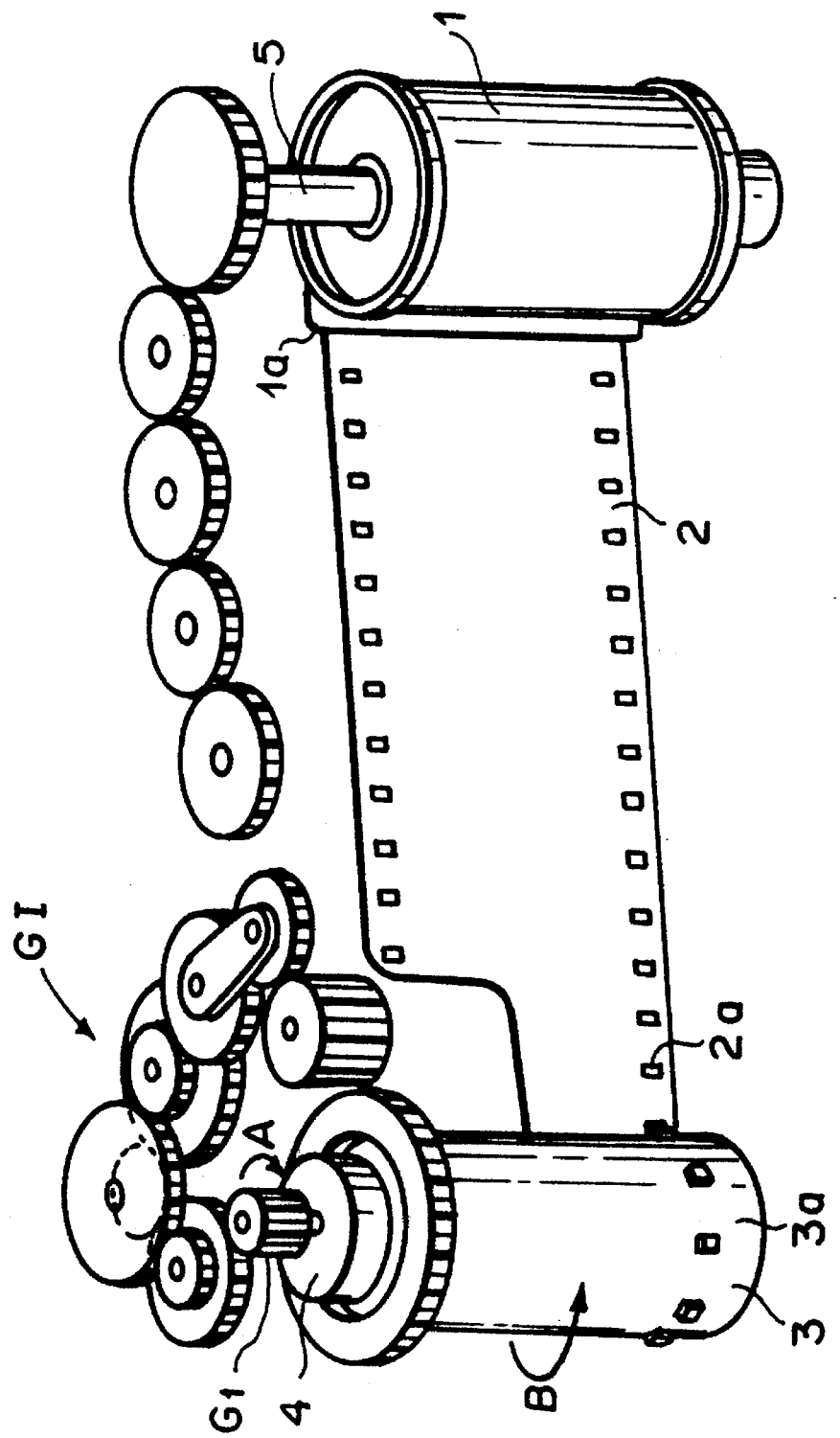
FIG. 1 is a schematic representation for explaining a conventional common film feeder.

FIG. 2 is a schematic representation showing a film feeder in one embodiment according to the present invention. The film feeder feeds a film 2 taken out of a film supply slot 1a of a cartridge 1 set in a predetermined location in a camera. The film feeder is provided with a film feed motor 4 for rotating a takeup spool 3, around which the leading end of the film 2 is coiled, in the direction shown by an arrow B to take up the film 2 as well as rotating a film spool of the cartridge 1 in a rewinding direction after all frames of the film 2 have been exposed, so that the film 2 is rolled up in the cartridge 1. The film 2 is taken up as a result of transmission of a forward torque (in the direction shown by an arrow A) of the film feed motor 4 to a spool gear 3b of the takeup spool 3, by way of a train of gears GI and a gear $G_2$. Meanwhile, the film 2 is rewound as a result of transmission of torque of the film feed motor 4 in a reverse direction (in the opposite direction to the direction shown by the arrow A) to the film spool of the cartridge 1, by way of the train of gears GI and a train of gears GII. Pivotal movement of a gear within planetary gears 6 decides whether the train of gears GI are coupled to the gear $G_2$ or the train of gears GII.

The film feeder is further provided with a motor driver 7 for actuating the film feed motor 4, a photosensor 8 for outputting a detection signal (i.e. a pulse signal) upon detection of perforations 2a of the film 2, and a film feed control means 9 (including a film tension control means) which receives a film set signal, a shutter release signal, and the detection signal output from the photosensor 8, and sends a predetermined control signal to the motor driver 7 so that the film feed motor 4 will be rotated by a predetermined amount in a given direction.

More specifically, upon receipt of the film set signal, the film feed control means 9 causes the film feed motor 4 to forwardly rotate in such a way that the takeup spool 3 takes up the first frame of the film 2 to an exposure position. Meanwhile, upon receipt of the shutter release signal, the film feed control means 9 causes the film feed motor 4 to forwardly rotate in such a way that the takeup spool 3 takes up the second frame of the film to the exposure position.

After all frames of the film 2 have been exposed, the film feed motor 4 is rotated in a reverse direction by a predetermined amount so as to rewind all of the film 2 around the film spool of the cartridge 1. Since the perforations 2a are provided in the film 2 at predetermined intervals according to a standard, and the film feed control means 9 counts a perforation detection signal from the photosensor 8 and controls a stop position of the film 2 on the basis of a count value, the film is stopped at a predetermined location.

The end gear $G_3$ of the train of gears GII is provided with a fork 5 coaxially attached to the film spool of the cartridge 1. Engagement of the end of the fork 5 with the film spool of the cartridge 1 causes torque of the film feed motor 4 to be transmitted to the film spool of the cartridge 1.

In this embodiment, the film feeder is also provided with a rotary vane 10 coaxially engaging with a gear $G_1$ attached to the rotary shaft of the film feed motor 4, and a photosensor 11 having a U-shaped cross section for detecting rotation of the rotary vane 10. The rotary vane 10 is provided with a plurality of vanes which have the same shape and are disposed at equal angles. Every time the vane passes through the inside of the photosensor 11, the photosensor 11 outputs a detection pulse to the film feed control means 9. More specifically, the rotary vane 10 rotates in accordance with the revolution of the film feed motor 4, and a detection pulse corresponding to the number of revolutions of the rotary vane 10 is inputted into the film feed control means 9. It is possible to detect a phase of the film feed motor 4 by counting the number of detection pulses. It is possible for the film feed control means 9 to position the film 2 with great accuracy by virtue of the number of passing perforations based on the perforation detection signal from the photosensor 8 and the number of revolutions (or an angle) of the film feed motor 4 based on the pulse signal from the photosensor 11.

In this film feeder, after the film 2 has been taken up by a predetermined amount by means of the film feed motor 4 (after the first frame, or a subsequent frame, of the film 2 has been set to the exposure position), the film feed motor 4 is reversely rotated in such a way that the spool gear 3b of the takeup spool 3 is very slightly rotated only by an amount corresponding to backlash. The number of revolutions of the film feed motor 4 can be detected with great accuracy on the basis of the detection pulse corresponding to the number of revolutions of the rotary vanes 10.

Immediately after the film 2 has been taken up, tension acting longitudinally on the film 2 impairs the flatness of the film 2. However, by virtue of the very slight rotation of the takeup spool 3, the tension acting longitudinally on the film 2 is removed while a frame of the film 2 is substantially maintained at the exposure position, whereby it is possible to improve the flatness of the film 2. In this way, it is possible to expose the frame of the film having superior flatness.

A reduction ratio between the gear $G_1$ and the spool gear 3b is set to about 200. Supposing that the number of gear teeth of the spool gear 3b is 200, it is necessary to revolve the gear $G_1$ through, for example, about 180° in order to rotate the spool gear 3b only to allow for backlash.

FIG. 3 shows the structure of the film feed control means 9. The film feed control means 9 is made up of a CPU 9a and a memory 9b in which control programs are stored. It is seen that the revolution of the film feed motor 4 is controlled, by way of the motor driver 7, on the basis of each signal inputted to the CPU 9a.

The number of revolutions of the takeup spool 3 occurring when the spool 3 is very slightly rotated to eliminate the tension acting longitudinally on the film 2, is obtained by detection of the number of revolutions of the rotary shaft of the film feed motor 4 as previously mentioned. Alternatively, the number of revolutions of the takeup spool 3 may be detected by detecting, for example, a lapse of time from a start of reverse revolution of the film feed motor 4.

Processing of the CPU 9a used in the previously mentioned film feeder will now be explained with reference to the flow charts shown in FIGS. 4 and 5. For the processing shown in the flow charts, the number of revolutions of the takeup spool 3 is obtained by detection of the lapse of time from the start of reverse revolution of the film feed motor 4.

FIG. 4 shows a main routine associated with processing of the CPU 9a. In this routine, whether or not the cartridge 1 is set (practically, whether or not the film drawn from the cartridge 1 is set to a predetermined location is determined by receipt of a film set signal), and whether or not a back cover of the camera is closed are determined in step 1 (S1) and step 2 (S2), respectively. When it is determined that the back cover is closed, the film 2 is fed to the position where the first frame of the film 2 is exposed in step 3 (S3). The film 2 is fed by means of the film feed motor 4. The CPU 9a then proceeds to step 4 (S4), and a frame-feed subroutine is carried out, so that the film 2 is taken up only for one frame. Thereafter, whether or not all frames of the film 2 have been exposed is determined in step 5 (S5). The frame-feed subroutine (S4) is repeatedly carried out until all frames of the film 2 are exposed. When it is determined that all frames of the film 2 are exposed, the film 2 is completely rewound in step 6 (S6), and the main routine is finished.

In effect, after the last frame of the film 2 has been exposed in steps 4 (S4) and 5 (S5), the CPU 9a proceeds to step 6 (S6) without carrying out further feeding of a frame.

With reference to FIG. 5, the frame-feed subroutine will now be described. In this subroutine, whether or not a shutter release button is pressed is determined in step 11 (S11). When it is determined that the shutter release button has been pressed, automatic focusing (S12) and exposure (S13) are carried out, and an object image is photographed on the film 2. After the object image has been photographed, the film feed motor 4 is actuated (S14), and the film feed motor 4 is forwardly rotated (S15) to take up the film 2. In step 16 (S16), whether or not the film 2 is fed for one frame is determined on the basis of the perforation detection signal. When it is determined that the film 2 has been fed for one frame, both terminals of the film feed motor 4 are electrically shortcircuited, so that motor braking is applied to the film feed motor 4 (S17), and the feeding of the film 2 is stopped.

Subsequently, the film feed motor 4 is reversely rotated to eliminate the tension acting longitudinally on the film 2 in step 18 (S18); namely, the film feed motor 4 is rotated in the direction in which the film 2 is rewound. Whether or not the spool gear 3b is very slightly rotated only through an angle corresponding to the backlash of the spool gear, that is, whether or not time $T_R$ has elapsed from the start of reverse rotation is determined (S19). When it is determined that the time $T_R$ has elapsed, both terminals of the film feed motor 4 are electrically shortcircuited, whereby the film feed motor 4 undergoes motor braking (S20). In this way, an operation for removing tension of the film 2 is completed. Then, the film feed motor 4 is turned off (S21), and the frame-feed subroutine is completed.

The film feeder according to the present invention is not limited to that shown in the previous embodiment. Any types of film feeder are acceptable so long as they have a construction for reversely actuating (for example, reversely rotating) the film feed motor only by an amount sufficient to relieve the tension acting longitudinally on the film after a frame of the film is fed. The film feeder of this invention can be subjected to various modifications.

For example, the number of revolutions of the film feed motor required to relieve film tension is not limited to the number mentioned in the previous embodiment, and as a matter of course it is possible to set the number to an appropriate value depending on the situation.

The means for detecting the number of revolutions of the takeup spool is not limited to the photosensor in the previous embodiment, but various types of detecting means may be used, for example, a roller may be brought into contact with the surface of a film which rotates in accordance with the feeding of the film, whereby the amount of movement of the takeup spool is detected from the number of revolutions of the roller.

The present invention can not only be applied to a cartridge used as a film container for storing a film in the present invention, but it is also applicable to various film containers such as a so-called film cartridge having, for example, a light-shielding closure which opens and closes together with opening and closing actions of the back cover in an interlocking fashion.

In the previous embodiment, a frame of the film is fed by drawing and taking up the film from the film container by means of the takeup spool. However, as a matter of course, it is also possible to apply the present invention to a camera in which the entire film is first taken up around a takeup spool and the film is fed one frame at a time by rewinding the film around a film spool into a film container.

Moreover, the film tension control means in the film feeder of the present invention can be separated from the film feed control means.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A film feeder for taking up a film from a film container one frame at a time by rotation of a takeup spool driven by a film feed motor comprising:

first detector means for detecting linear motion of the film with respect to an exposure station;

second detector means for detecting angular motion of the film feed motor; and a film tension control means responsive to the first and second detector means for actuating said film feed motor in the opposite direction to the direction in which said film is fed only by an amount sufficient to relieve the tension of said film while said film is maintained at a predetermined position every time said film is fed for one frame.

2. The film feeder as defined in claim 1, wherein the first detector means comprises:

a first photosensor means which sends a detection signal to said film tension control means upon detection of perforations of said film;

and the second detector means comprises:

a rotary vane coaxially attached to a rotary shaft of said film feed motor; and a second photosensor having a U-shaped cross section for detecting rotation of said rotary vane and delivering an output of a detection pulse to said film tension control means every time said rotary vane passes through said photosensor.

3. The film feeder as defined in claim 2, further comprising:

a first train of gears at one end thereof connected to said rotary shaft of said film feed motor for transmitting a driving force for feeding purposes from said film feed motor to said takeup spool;

a second train of gears at one end thereof connected to a rewinding fork of said film container for transmitting a driving force for rewinding purposes from said film feed motor to said rewinding fork; and planetary gears with a larger gear thereof connected to the other end of said first train of gears for transmitting said driving force to said takeup spool when said driving force is to take up said film but transmitting said driving force to said rewinding fork when said force is to rewind said film.

4. A film feeder for taking up a film from a film container one frame at a time by rotation of a takeup spool driven by a film feed motor comprising a first train of gears for transmitting a driving force for feeding purposes from said film feed motor to said takeup spool, a second train of gears for transmitting a driving force for rewinding purposes from said film feed motor to a rewinding fork, and planetary gears for transmitting said driving force for feeding purposes to said takeup spool when said driving force for rewinding purposes to said rewinding fork when said force is to rewind said film;

first detector means for detecting linear motion of the film with respect to an exposure station;

second detector means for detecting angular motion of the film feed motor; and a film tension control means responsive to the first and second detector means for actuating said film feed motor in the opposite direction to said film feed direction only by an amount sufficient to relieve the tension of said film while said film is maintained at a predetermined position every time said film is fed for one frame.

5. The film feeder as defined in claim 4 wherein the first detector means comprises:

a first photosensor means which sends a detection signal to said film tension control means upon detection of perforations of said film;

and the second detector means comprises:

a rotary vane coaxially attached to a rotary shaft of said film feed motor; and a second photosensor having a U-shaped cross section for detecting rotation of said rotary vane which delivers an output of detection pulses to said film tension control means every time said rotary vane passes through said photosensor.

* * * * *

UNITED STATES PATENT AND TRADEMARK OFFICE
CERTIFICATE OF CORRECTION

PATENT NO. : 5,596,384
DATED : January 21, 1997
INVENTOR(S) : Yasuhiko Tanaka et al.

It is certified that error appears in the above-indentified patent and that said Letters Patent is hereby corrected as shown below:

Title page, Item 75, 2nd line: "Ohmiya" should read --Saitama-Ken--.

Column 3, line 13: "a" should read --in a--.

Column 8, line 6: "force" should read --force is to take up said film but transmitting said driving force--.

Signed and Sealed this

Fifteenth Day of July, 1997

Attest:

BRUCE LEHMAN

Attesting Officer

Commissioner of Patents and Trademarks